United States Patent
Ramaswamy et al.

(10) Patent No.: US 10,761,264 B2
(45) Date of Patent: Sep. 1, 2020

(54) TRANSMISSION LINES USING BENDING FINS FROM LOCAL STRESS

(71) Applicant: Intel Corporation, Santa Clara, CA (US)

(72) Inventors: Rahul Ramaswamy, Hillsboro, OR (US); Chia-Hong Jan, Portland, OR (US); Walid Hafez, Portland, OR (US); Neville Dias, Hillsboro, OR (US); Hsu-Yu Chang, Hillsboro, OR (US); Roman W. Olac-Vaw, Hillsboro, OR (US); Chen-Guan Lee, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/462,077

(22) PCT Filed: Dec. 30, 2016

(86) PCT No.: PCT/US2016/069538
§ 371 (c)(1),
(2) Date: May 17, 2019

(87) PCT Pub. No.: WO2018/125226
PCT Pub. Date: Jul. 5, 2018

(65) Prior Publication Data
US 2019/0278022 A1    Sep. 12, 2019

(51) Int. Cl.
*G02B 6/122*    (2006.01)
*G02B 6/12*    (2006.01)
(Continued)

(52) U.S. Cl.
CPC ............... *G02B 6/122* (2013.01); *G02B 6/00* (2013.01); *G02B 6/12002* (2013.01);
(Continued)

(58) Field of Classification Search
CPC .................... G02B 2006/12097; H01P 3/165
See application file for complete search history.

(56) References Cited

U.S. PATENT DOCUMENTS

| 2012/0148183 A1 | 6/2012 | Heaton |
| 2012/0182550 A1 | 7/2012 | Tang et al. |

(Continued)

OTHER PUBLICATIONS

International Search Report and Written Opinion for International Patent Application No. PCT/US2016/069538 dated Sep. 26, 2017, 8 pgs.

*Primary Examiner* — Omar R Rojas
(74) *Attorney, Agent, or Firm* — Schwabe, Williamson & Wyatt, P.C.

(57) ABSTRACT

Embodiments of the invention include an electromagnetic waveguide and methods of forming electromagnetic waveguides. In an embodiment, the electromagnetic waveguide may include a first semiconductor fin extending up from a substrate and a second semiconductor fin extending up from the substrate. The fins may be bent towards each other so that a centerline of the first semiconductor fin and a centerline of the second semiconductor fin extend from the substrate at a non-orthogonal angle. Accordingly, a cavity may be defined by the first semiconductor fin, the second semiconductor fin, and a top surface of the substrate. Embodiments of the invention may include a metallic layer and a cladding layer lining the surfaces of the cavity. Additional embodiments may include a core formed in the cavity.

25 Claims, 11 Drawing Sheets

(51) Int. Cl.
  *G02B 6/00* (2006.01)
  *H01P 3/16* (2006.01)
  *G02B 6/134* (2006.01)
  *G02B 6/136* (2006.01)

(52) U.S. Cl.
  CPC ......... *G02B 6/12007* (2013.01); *G02B 6/136* (2013.01); *G02B 6/1342* (2013.01); *G02B 2006/12097* (2013.01); *H01P 3/165* (2013.01)

(56) References Cited

U.S. PATENT DOCUMENTS

| | | |
|---|---|---|
| 2012/0183250 A1 | 7/2012 | Cheben et al. |
| 2012/0327398 A1 | 12/2012 | Chakravarty et al. |
| 2015/0053860 A1 | 2/2015 | Duane et al. |
| 2017/0236841 A1* | 8/2017 | Song .................... H01L 29/785 |
| | | 257/192 |
| 2020/0066595 A1* | 2/2020 | Glass ................. H01L 29/0657 |

* cited by examiner

TRANSMISSION LINES USING BENDING FINS FROM LOCAL STRESS

CROSS-REFERENCE TO RELATED APPLICATION

This patent application is a U.S. National Phase Application under 35 U.S.C. § 371 of International Application No. PCT/US2016/069538, filed Dec. 30, 2016, entitled "TRANSMISSION LINES USING BENDING FINS FROM LOCAL STRESS," which designates the United States of America, the entire disclosure of which is hereby incorporated by reference in its entirety and for all purposes.

FIELD OF THE INVENTION

Embodiments of the invention are in the field of semiconductor devices and processing and, in particular, the formation of on-chip electromagnetic wave guides formed with high aspect ratio bent fins.

BACKGROUND OF THE INVENTION

Optical fiber and nano patterned silicon based waveguides have been used as interconnects on-chip to transmit ultra-high frequencies. Typically, a waveguide includes an inner core layer, a dielectric cladding layer with a refractive index that is higher than the core layer, and an outer shielding layer. Such a structure guides optical waves by total internal reflection. The formation of these components presently requires unique processing operations that are not the same as those used to form the transistors, diodes, and/or other circuitry on the chip. Accordingly, the fabrication of such waveguides requires additional processing operations and utilizes additional area on the surface of the chip. Therefore, the use of such interconnects increases the overall cost of such chips.

DETAILED DESCRIPTION OF THE INVENTION

Described herein are systems that include an on-chip electromagnetic waveguide formed with bent fins and methods for forming on-chip electromagnetic waveguides, according to embodiments of the invention. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

Embodiments of the invention may utilize high aspect ratio fins to form a structure through which electromagnetic radiation may be propagated. According to an embodiment, electromagnetic waveguides may be formed with high aspect ratio fins that are patterned at the same time as high aspect ratio fins that are used to form transistors and other features on the semiconductor. The fins used to form the electromagnetic waveguide may be bent by stresses that are generated in a shallow trench isolation (STI) oxide when the STI oxide layer is annealed. As such, embodiments may utilize closely spaced fins that are subsequently bent towards each other to form a cavity with processing operations that are already needed to fabricate other devices on the substrate. Additionally, the electromagnetic waveguide may be modified by doping the fins and/or by including various cladding layers and shielding layers that may enhance the propagation of certain wavelengths of electromagnetic radiation, while at the same time attenuating the propagation of other wavelengths of electromagnetic radiation.

Figure 1A:
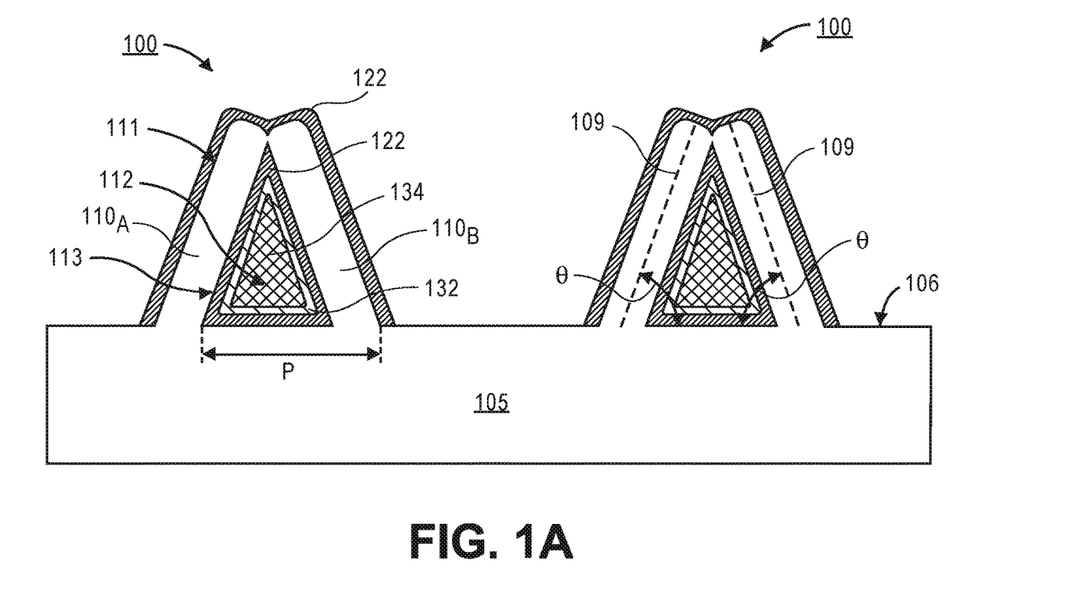
FIG. 1A is a cross-sectional illustration of an electromagnetic waveguide formed with bent fins, according to an embodiment of the invention.

Referring now to FIG. 1A, a cross-sectional illustration of a pair of electromagnetic waveguides 100 are shown according to an embodiment of the invention. According to an embodiment, the electromagnetic waveguide 100 may include a pair of bent fins 110A and 110E that extend up from a substrate 105. The fins 110A and 110E are bent towards each other to form a cavity 112 through which electromagnetic radiation may propagate. As used herein, a "bent fin" is a fin 110 that has a centerline 109 that forms an angle θ with a top surface 106 of substrate 105 on which the fin 110 is formed that is not substantially a right angle. For example, the angle θ may be approximately ±1° or more away from a right angle. In an embodiment, the angle θ may be ±15° or more away from a right angle. Embodiments may include bent fins that contact each other. In such embodiments, the shape of the cavity 112 may be defined by a first fin 110A, a second fin $110_B$, and a top surface 106 of the substrate 105. However, embodiments are not limited to such configurations and the shape of the cavity 112 may also be defined by additional material layers, as will be described in greater detail below. In an embodiment, the fins 110 are high aspect ratio fins 110. For example, the aspect ratio may be 10:1 or greater. In a specific embodiment, the aspect ratio may be 50:1 or greater. In an embodiment, the fins 110 may be spaced with a pitch P. The pitch P may be approximately 50 nm or less. In a particular embodiment, the pitch P may be approximately 42 nm or less.

In an embodiment, the fins 110 may be formed from a semiconducting material. For example, the fins 110 may be silicon. Additional embodiments may include fins 110 that are formed with other semiconductor materials, such as III-V semiconductor materials. The fins 110 may be a single semiconductor material or the fins may include a stack of two or more semiconductor materials. In an embodiment, the fins 110 may be the same material as the substrate 105. For example, the substrate 105 may be a semiconductor substrate. In one implementation, the semiconductor substrate 105 may be a crystalline substrate formed using a bulk semiconductor or a semiconductor-on-insulator substructure. In one particular embodiment, the semiconductor substrate 105 may include a stack of semiconductor materials. For example, the semiconductor substrate 105 may include a silicon base layer and one or more III-V semiconductor materials grown over the silicon base layer. In one example, a GaN layer may be separated from the silicon base layer by one or more buffer layers. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. Although a few examples of materials from which the substrate 105 and fins 110 may be formed are described here, any material that may serve as a foundation upon which a semiconductor device may be built falls within the spirit and scope of embodiments of the invention.

In an embodiment, the fins 110 may also be doped in order to change the propagation characteristics of the electromagnetic waveguide 100. In an embodiment, the fins 110 may be doped with an implantation/diffusion process. For example, dopants (e.g., boron, phosphorous, silicon, magnesium, nitrogen, or any other commonly used dopant) may be ion-implanted into the fins 110. An annealing process that activates the dopants and causes them to diffuse further into the fins 110 typically follows the ion implantation process. Doping may be used to enhance and/or attenuate the propagation of specific wavelength through the electromagnetic waveguides 100, by changing the refractive index of the fins 110.

According to an embodiment, a conductive layer 122 may be formed over the surfaces of the fins 110 to provide shielding to the electromagnetic waveguide. The conductive layer 122 may be a conformal layer. As such, the conductive layer 122 may be formed on the outer surfaces 111 of the fins 110 and the inner surfaces 113 that define the cavity 112 without filling the cavity 112. For example, the conductive layer 122 may be a metallic material. In a particular embodiment, the conductive layer 122 may be titanium nitride. In some embodiments, the conductive layer 122 may be omitted. In embodiments where the conductive layer 122 is omitted, the fins 110 may be highly doped so that they function as a conductive material.

In order to improve the propagation efficiency of the electromagnetic waveguide 110, embodiments of the invention may include a cavity 112 that is lined with a cladding layer 132 and filled with a core 134. The cladding layer 132 may be a material that has a refractive index that is greater than a refractive index of the core 134. In an embodiment, the cladding layer 132 may be a dielectric material. For example, the cladding layer 132 may be glass. Additionally, it is to be appreciated that the cladding layer 132 is formed with a conformal deposition process. As such, the cladding layer 132 may form over the surfaces of the conductive layer 122 within the cavity 112 without filling the cavity 112. In an embodiment, the core 134 may be an insulative material. For example, the core 134 may be an oxide, such as an STI oxide. Additional embodiments may omit forming a core 134 in the cavity 112 (i.e., the cavity 112 may have an air core 112).

Figure 1B:
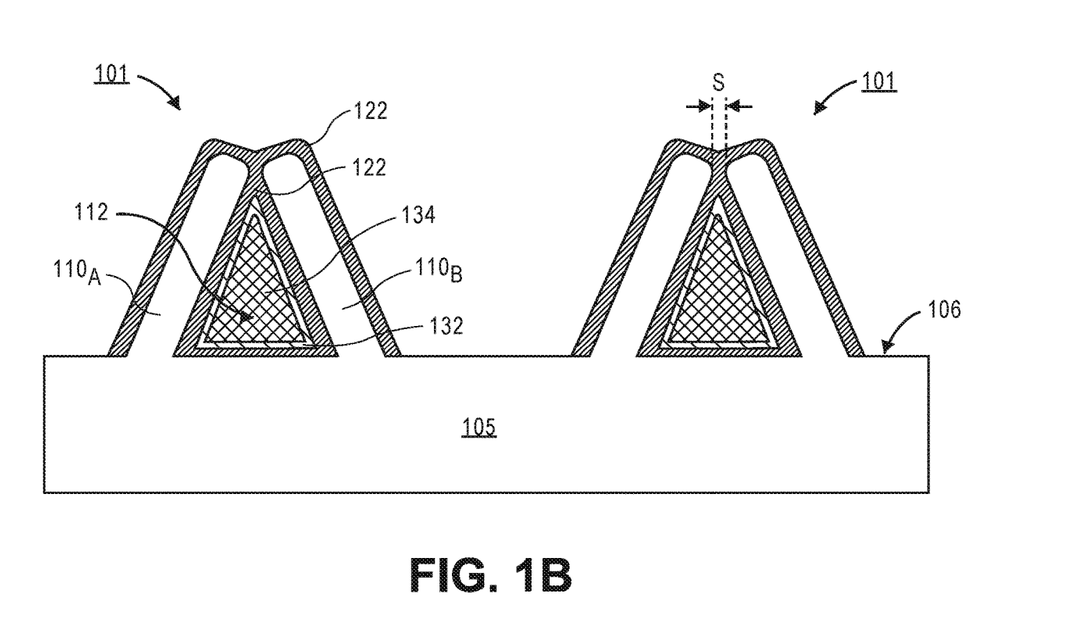
FIG. 1B is a cross-sectional illustration of an electromagnetic waveguide formed with bent fins where the fins do not contact each other, according to an embodiment of the invention.

Referring now to FIG. 1B, a pair of electromagnetic waveguides 101 are shown, according to an additional embodiment of the invention. The electromagnetic waveguides 101 are substantially similar to the electromagnetic waveguides 100 illustrated in FIG. 1A with the exception that the fins 110 do not contact each other. In an embodiment, the ends of fins 110 may be spaced away from each other by a spacing S. For example, the spacing S may be less than approximately 15 nm. In an additional embodiment, the spacing S may be less than approximately 5 nm. Since the fins 110 do not contact each other to form a sealed cavity 112, the conductive layer 122 may be used to fill the gap between the ends of the fins 110. The conformal deposition process allows for the conductive layer 122 to grow together and seal the cavity 112 without filling the cavity 112 with the conductive material. Accordingly, the shape of the cavity 112 may be defined by a first fin 110A, a second fin $110_B$, the top surface 106 of the substrate 105, and a portion of the conductive layer 122

Figure 2:
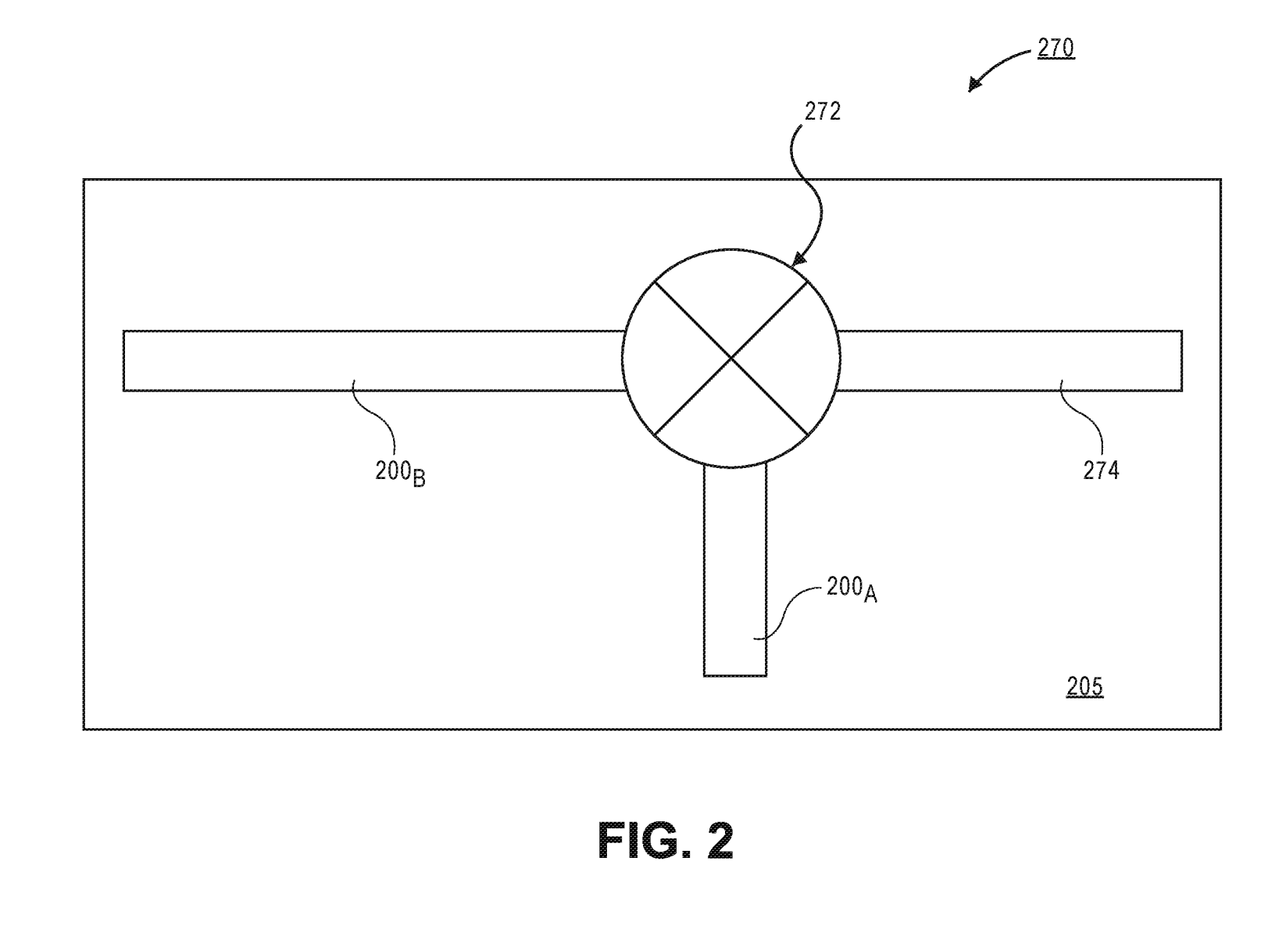
FIG. 2 is a schematic illustration of a portion of a semiconductor substrate where an on-chip mixer is fabricated, according to an embodiment of the invention.

Referring now to FIG. 2, a schematic plan view of a portion of an on-chip mixer region 270 is shown, according to an embodiment. In FIG. 2, a first electromagnetic waveguide 200A and a second electromagnetic waveguide $200_B$ are formed on a substrate 205 and are communicatively coupled with an on-chip mixer 272. In an embodiment, the first and second electromagnetic waveguides 200A and $200_B$ may be substantially similar to the electromagnetic waveguides 100 or 101 described above with respect to FIGS. 1A and 1B, and therefore, will not be described in greater detail here. Embodiments may also include an on-chip mixer that is fabricated on the semiconductor substrate 205. In a particular embodiment, transistors, diodes, and/or other circuitry and components used to form the mixer 272 may be fabricated substantially in parallel with the formation of the first and second electromagnetic waveguides 200A and 200$_B$. According to an embodiment, the first electromagnetic waveguide 200A may be used to transmit a local oscillator signal to the mixer 272 and the second electromagnetic waveguide 200$_B$ may be used to transmit an information signal to the mixer 272. Accordingly, the mixer 272 may generate a difference frequency output signal that is transmitted along a third electromagnetic waveguide 274. The use of such a mixer 272 may allow for the difference frequency signal to be generated in the far IR (i.e., 1-3 THz) range.

While embodiments illustrated and described in FIGS. 1A, 1B, and 2 each include at least two electromagnetic waveguides, embodiments are not limited to such configurations. Particularly, embodiments may include any number of electromagnetic waveguides formed on a substrate. For example, a single electromagnetic waveguide may be formed on the substrate or two or more electromagnetic waveguides may be formed on the substrate. Furthermore, while embodiments of the invention describe the formation of electromagnetic waveguides in the mixer region 270 of the substrate 205, it is to be appreciated that electromagnetic waveguides formed according to embodiments of the invention may be fabricated on any portion of the semiconductor substrate 205.

Referring now to FIGS. 3A-3I, a series of cross-sectional illustrations depicting processing operations for forming an electromagnetic waveguide with bent fins are shown, according to an embodiment of the invention. Starting with FIG. 3A, a sacrificial mask structure 352 is formed over a semiconductor substrate 305. In an embodiment, the sacrificial mask structure 352 may be formed over an isolation layer 307. For example, the isolation layer 307 may be any suitable etchstop material (e.g., a nitride). The sacrificial mask structure 352 may be polysilicon or any other suitable material. Spacers 353 may also be formed along the sidewall surfaces of the sacrificial mask structure with known spacer deposition and etching processes. The spacers 353 may be a material that is resistant to an etching chemistry used to selectively remove the sacrificial mask structure 352. For example, the spacers 353 may be an oxide, a nitride, or the like. The use of spacers 353 allows for the spacing and critical dimension of the features patterned into the substrate 305 to be reduced. In an embodiment, the pitch P of the spacers 353 that are formed along the vertical faces of the sacrificial mask structure 352 that face each other may be approximately 50 nm or less. In an embodiment, the pitch P may be approximately 42 nm or less. As such, the subsequently formed fins are spaced close enough together so that they may be bent towards each other to form a cavity.

Figure 3A:
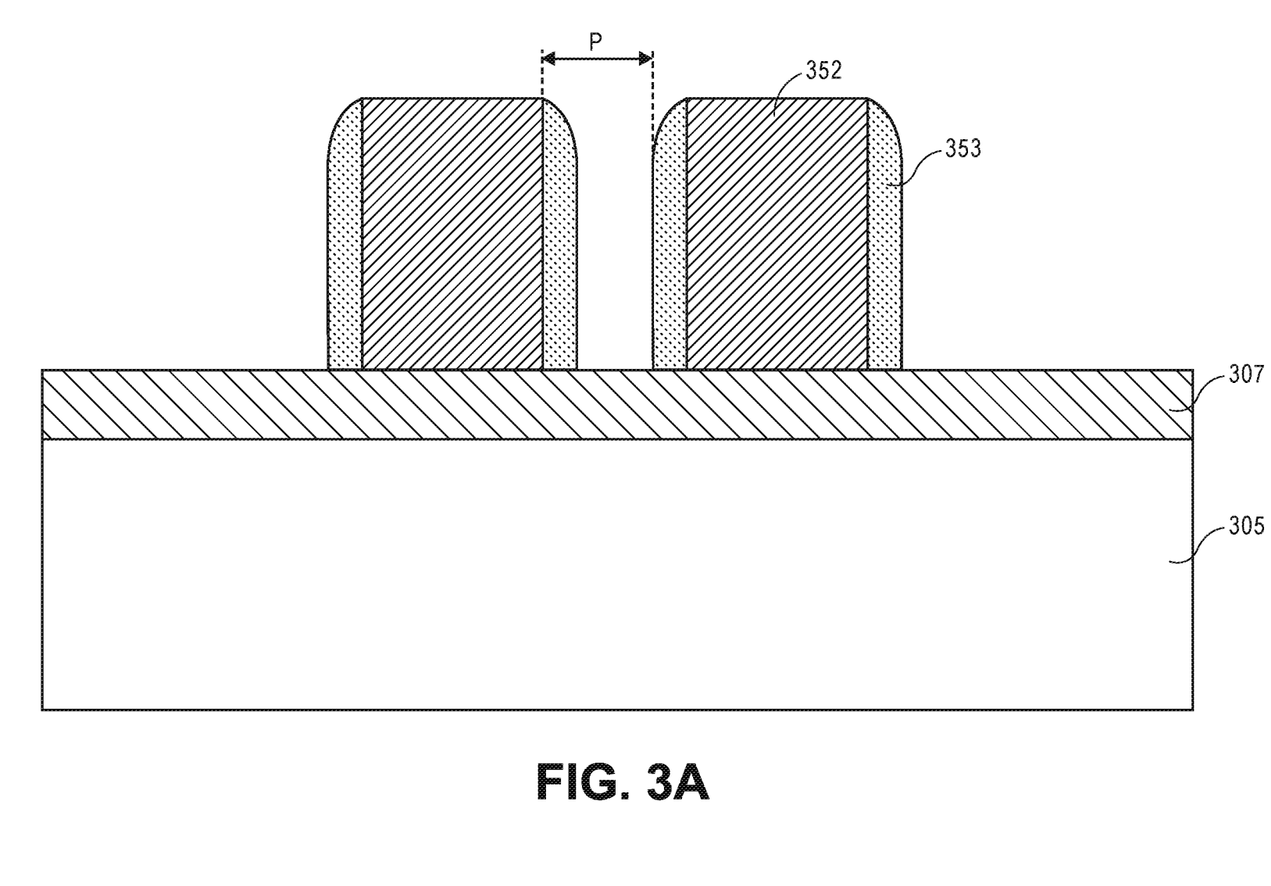
FIG. 3A is a cross-sectional illustration after a sacrificial mask layer with sidewall spacers is formed over a surface of the substrate, according to an embodiment of the invention.
Figure 3B:
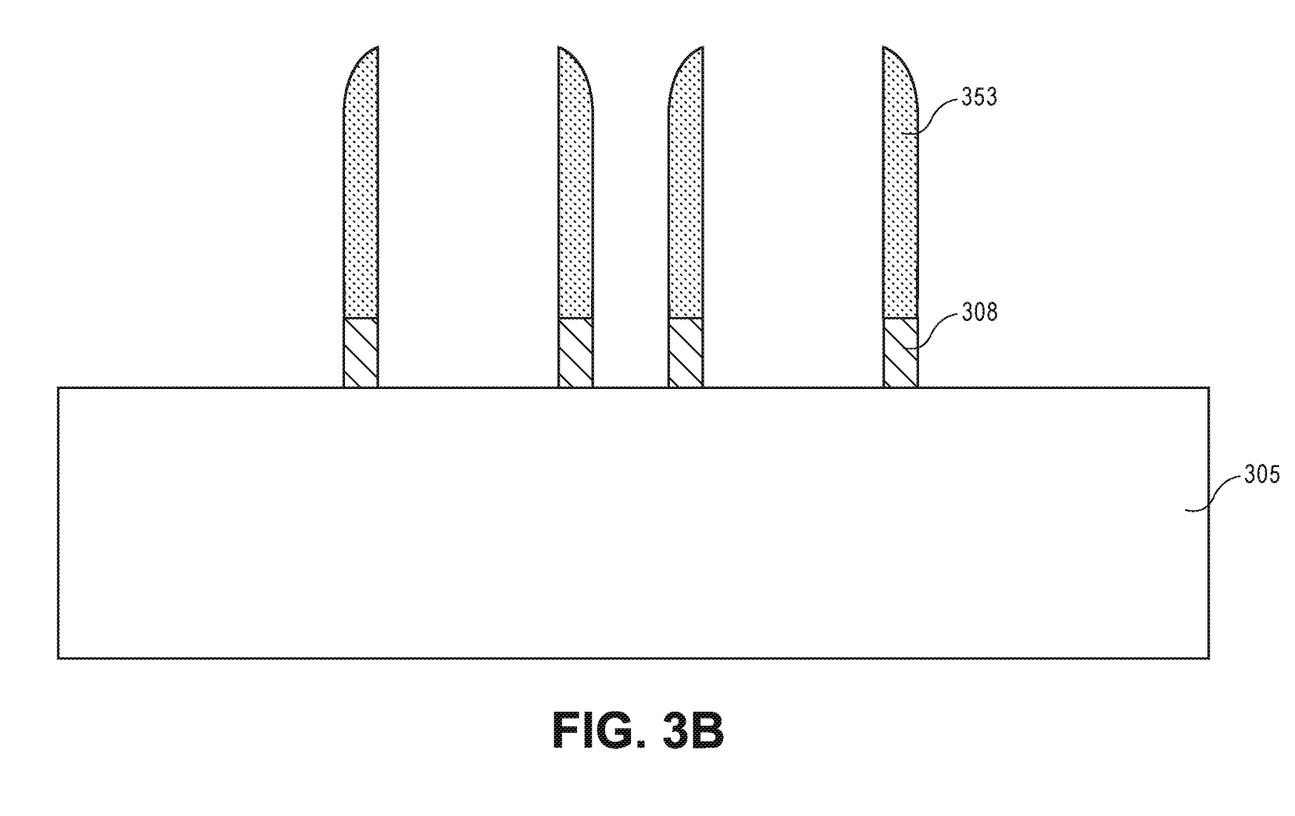
FIG. 3B is a cross-sectional illustration after the sacrificial mask layer is removed leaving behind the spacers, according to an embodiment of the invention.

Referring now to FIG. 3B, a cross-sectional illustration is shown after the sacrificial mask structure 352 is removed, according to an embodiment of the invention. In an embodiment, the sacrificial mask structure 352 may be removed with any suitable etching process (e.g., wet etching or dry etching). As illustrated, the etching process may also include removing portions of the isolation layer 307 that are not covered by the spacers 353 to form a patterned hardmask 308. In an embodiment, the sacrificial mask structure 352 and the isolation layer 307 may be removed with different etching chemistries.

Figure 3C:
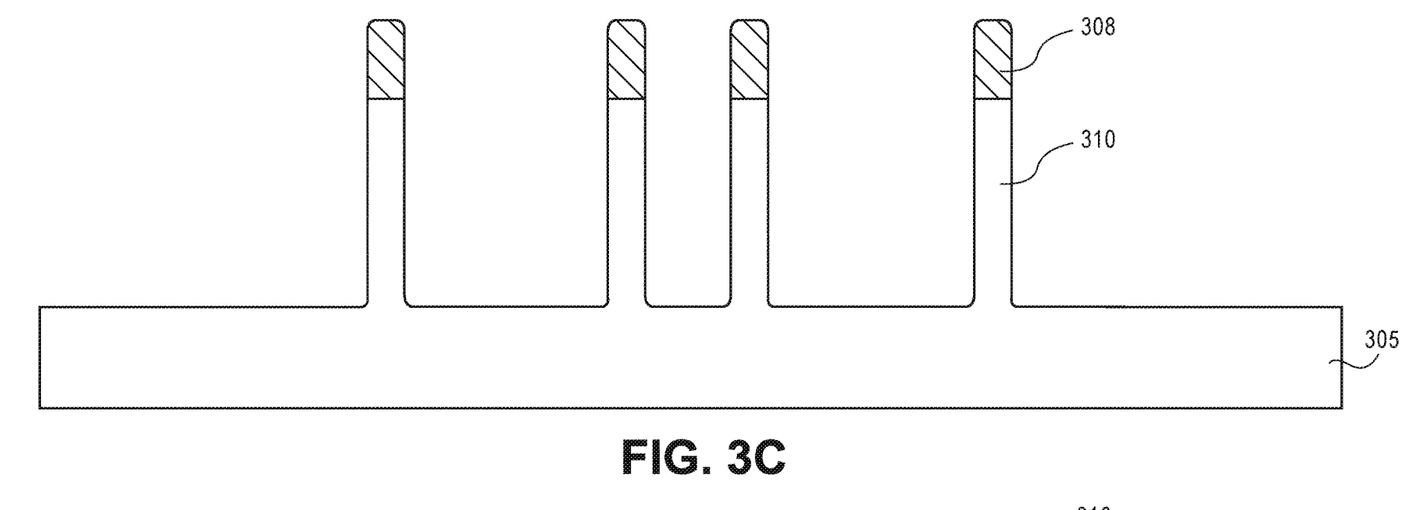
FIG. 3C is a cross-sectional illustration after the pattern of the spacers is transferred into the substrate to form high aspect ratio fins, according to an embodiment of the invention.

Referring now to FIG. 3C, a cross-sectional illustration is shown after the pattern of the spacers 353 has been transferred into the semiconductor substrate 305, according to an embodiment of the invention. In an embodiment, the spacers 305 formed above the patterned hardmask 308 may be removed prior to etching the semiconductor substrate 305. Embodiments may then include etching the semiconductor substrate 305 using the patterned hardmask 308 as a mask to form fins 310. For example, the semiconductor substrate 305 may be etched with a dry etching process (e.g., plasma etching or the like). The fins 310 may be high aspect ratio fins 310. For example, the aspect ratio may be 10:1 or greater. In a specific embodiment, the aspect ratio may be 50:1 or greater.

It is to be appreciated that the process for forming the fins 310 described in FIGS. 3A-3C may be substantially similar to the process for forming fins that will be further processed to form non-planar transistors (not shown) on the semiconductor substrate 305. Accordingly, the fins 310 used for the electromagnetic waveguide may be formed in parallel with the fins used to form non-planar transistors or other devices. Therefore, additional processing operations are not needed to fabricate the fins 310, and the throughput is not significantly decreased.

Figure 3D:
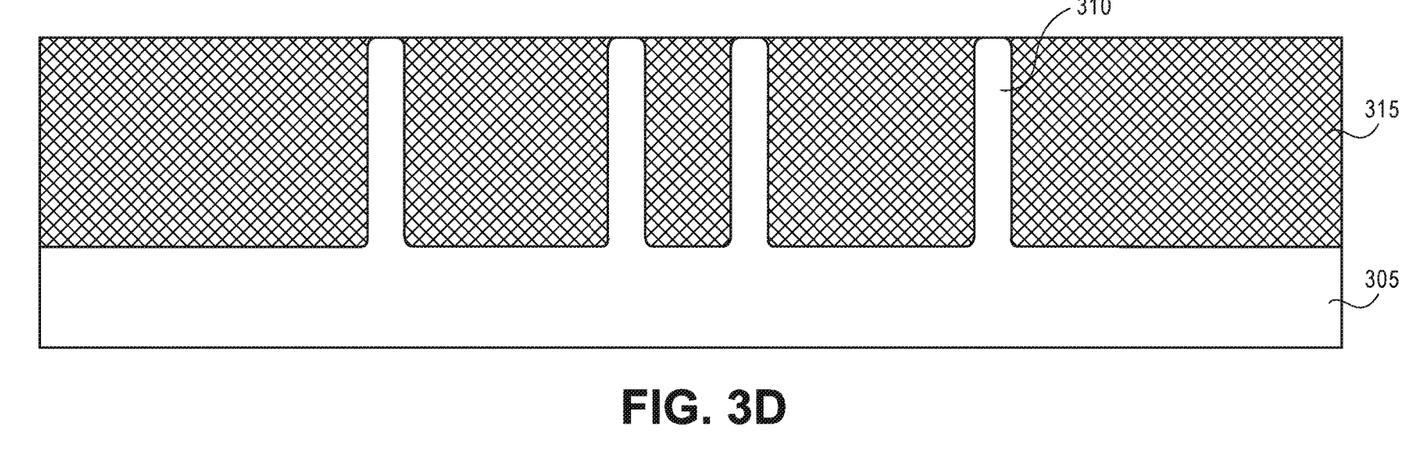
FIG. 3D is a cross-sectional illustration after a shallow trench isolation (STI) oxide is formed around the fins, according to an embodiment of the invention.

Referring now to FIG. 3D, a cross-sectional illustration is shown after an isolation oxide is deposited over the substrate 305, according to an embodiment of the invention. In an embodiment, the patterned hardmask 308 may be removed with an etching process and the isolation oxide 315 may be deposited over the semiconductor substrate 305. For example, the isolation oxide 315 may be deposited with a chemical vapor deposition (CVD) process, a plasma enhanced chemical vapor deposition (PECVD) process, or the like. The isolation oxide 315 may then be planarized with a top surface of the fins 310. For example, the isolation oxide 315 may be planarized with a chemical mechanical polishing (CMP) process, or the like. In an additional embodiment, the patterned hardmask 308 may be removed during the planarization process after the isolation oxide 315 is deposited. In an embodiment, the isolation oxide 315 may be formed at the same time a shallow trench isolation (STI) oxide is deposited in the active regions (i.e., regions where transistor devices are fabricated) of the semiconductor substrate 305. Accordingly, the formation of the isolation oxide 315 may not require additional processing operations to be added to the process flow.

Figure 3E:
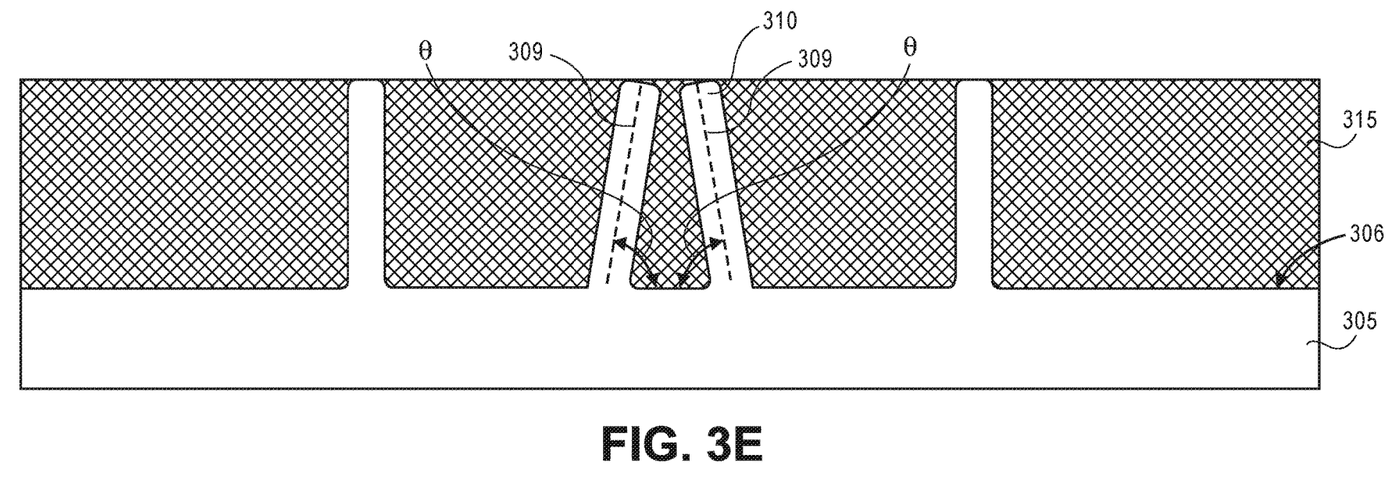
FIG. 3E is a cross-sectional illustration after the STI oxide is annealed and the fins are bent towards each other, according to an embodiment of the invention.

Referring now to FIG. 3E, a cross-sectional illustration is shown after the isolation oxide is annealed, according to an embodiment of the invention. In an embodiment, the annealing process may be a typical annealing process used in STI formation. For example, the annealing process may range from approximately 800° C. to approximately 1100° C., and be held for lengths of times between tens of seconds to tens of minutes. According to an embodiment, annealing the isolation oxide 315 induces stresses in the isolation oxide 315. Due to the high aspect ratio of the fins 310, the stress in the isolation oxide 315 may cause the fins 310 that are closely spaced to each other to bend towards each other. In an embodiment, the fins 310 are bent towards each other so that a centerline 309 of the fin 310 and a top surface 306 of substrate 305 on which the fin 310 is formed produce an angle θ that is not substantially a right angle. For example, the angle θ may be approximately ±1° or more away from a right angle. In an embodiment, the angle θ may be ±15° or more away from a right angle. In an embodiment, the angle θ of each fin 310 may be substantially similar to each other. In an additional embodiment, the angle θ of each fin 310 may not be substantially similar to each other. In the illustrated embodiment, the fins 310 are bent towards each other, but are not touching. However, in additional embodiments of the invention, the fins 310 may be bent so that they contact each other, similar to the embodiment illustrated in FIG. 1A.

Figure 3F:
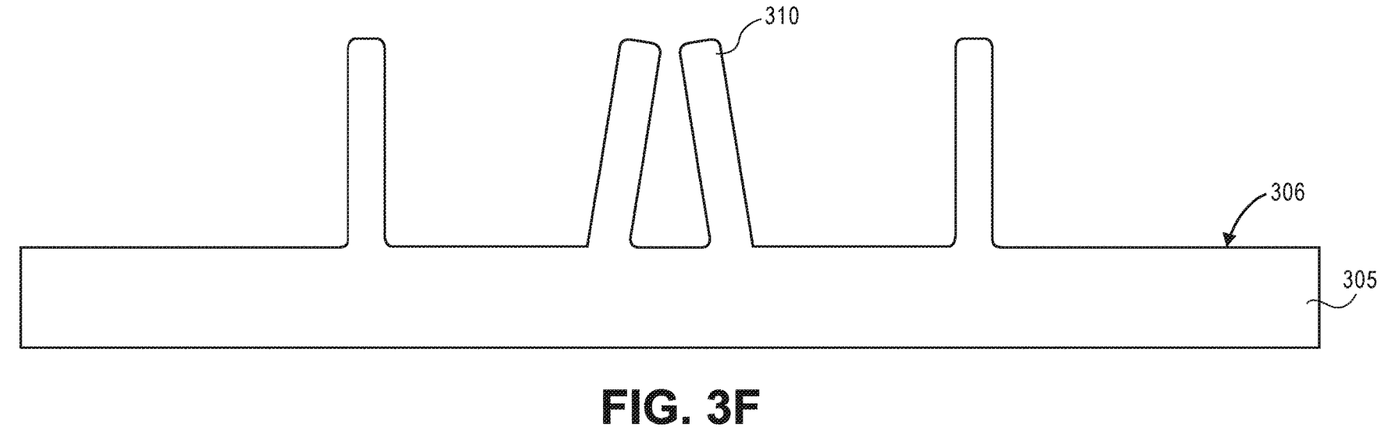
FIG. 3F is a cross-sectional illustration after the STI oxide is removed from around the fins, according to an embodiment of the invention.

Referring now to FIG. 3F, a cross-sectional illustration is shown after the isolation oxide is removed, according to an embodiment of the invention. In an embodiment, the isolation oxide 315 may be removed with a suitable etching process. For example, a wet etching process may be used to remove the isolation oxide 315. In some embodiments the exposed fins 310 may be doped with dopants to alter the propagation characteristics of the electromagnetic waveguide. For example, dopants (e.g., boron, phosphorous, silicon, magnesium, nitrogen, or any other commonly used dopant) may be ion-implanted into the fins 310. An annealing process that causes the dopants to diffuse further into the fins 310 may follow the ion implantation process. It is to be appreciated that the fins 310 may also be doped prior to the formation of the isolation oxide 315 or at any other suitable time in accordance with other embodiments of the invention.

Figure 3G:
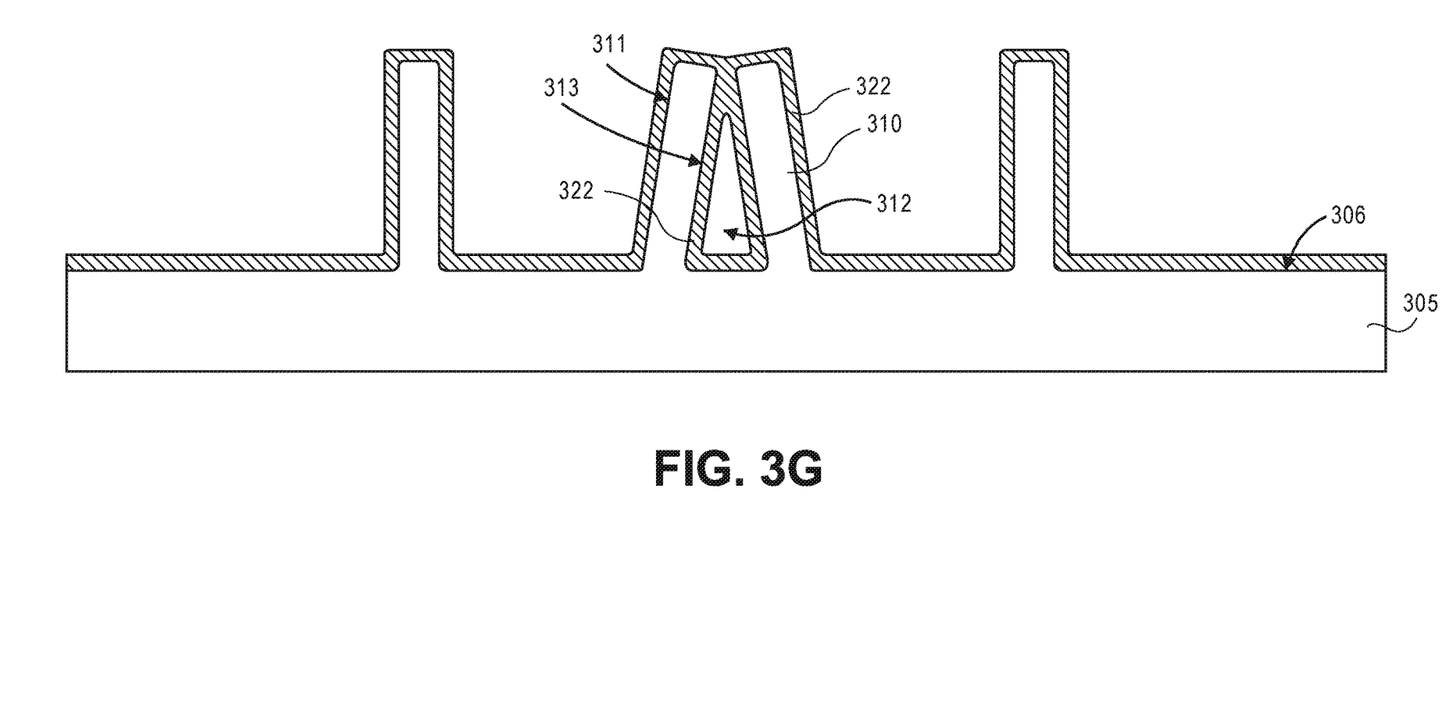
FIG. 3G is a cross-sectional illustration after a conductive layer is deposited over the surfaces of the high aspect ratio fins, according to an embodiment of the invention.

Referring now to FIG. 3G, a cross-sectional illustration is shown after a conductive layer 322 is formed over the surfaces of the fins 310 to provide shielding to the electromagnetic waveguide. The conductive layer 322 may be a conformal layer. In an embodiment, the conductive layer 322 may be deposited with a conformal deposition process such as atomic layer deposition (ALD). As such, the conductive layer 322 may form on the outer surfaces 311 of the fins 310 and the inner surfaces 313 that face the cavity 312 without filling the cavity 312. In embodiments where the fins 310 do not contact each other, the conductive layer 322 may be grown to a thickness that results in the opening between the fins 310 being closed to form an enclosed cavity 312 between the fins 310. In an embodiment, the conductive layer 322 may be between approximately 1 nm thick or greater. In some embodiments, the conductive layer 322 may be approximately 50 nm thick or greater. In an embodiment, the conductive layer 322 may be a metallic material. In a particular embodiment, the conductive layer 322 may be titanium nitride. In some embodiments, the conductive layer 322 may be omitted. In such embodiments, the fins 310 may be highly doped so that they function as a conductive material.

Figure 3H:
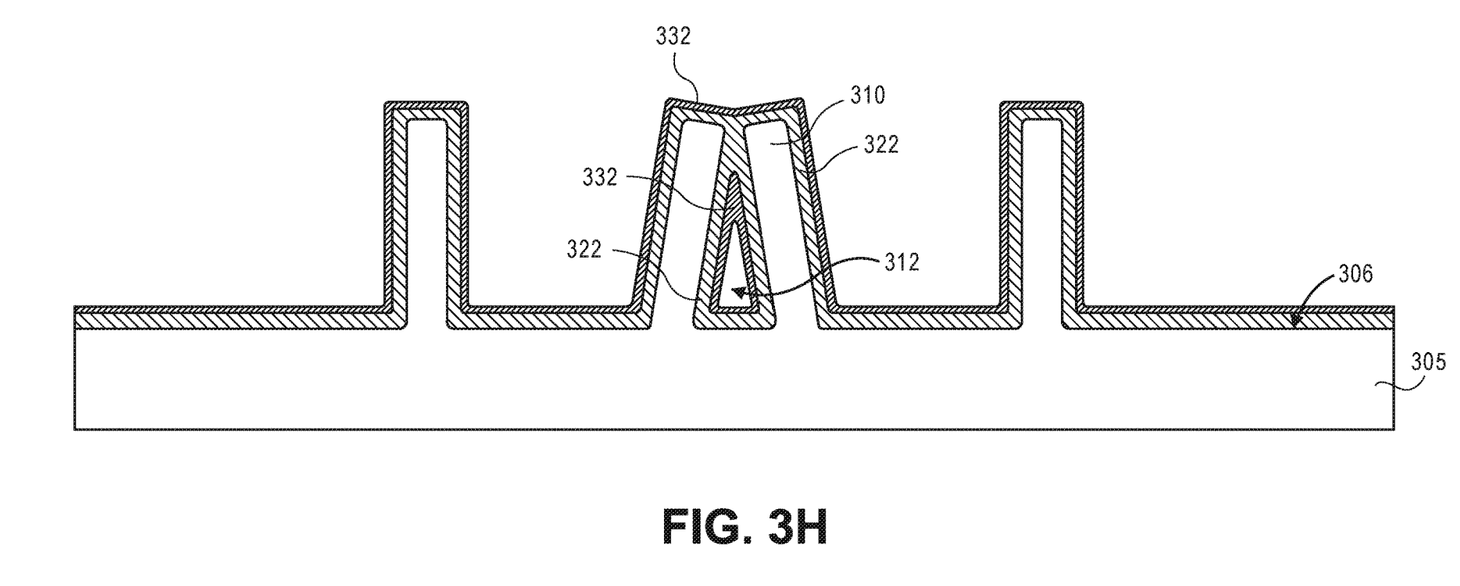
FIG. 3H is a cross-sectional illustration after a cladding layer is formed over the conductive layer, according to an embodiment of the invention.

Referring now to FIG. 3H, a cross-sectional illustration is shown after a cladding layer 332 is formed, according to an embodiment. In an embodiment, the cladding layer 332 may be a dielectric material. For example, the cladding layer 332 may be glass. Additionally, it is to be appreciated that the cladding layer 332 may be formed with a conformal deposition process, such as an ALD process. As such, the cladding layer 332 may form over the surfaces of the conductive layer 322 within the cavity 312 without filling the cavity 312. In an embodiment, the cladding layer 332 may be between approximately 1 nm thick or greater. In some embodiments, the cladding layer 332 may be approximately 50 nm thick or greater. In an embodiment, the cladding layer 332 may also be doped in order to alter the refractive index of the cladding layer 322 to improve transmission of a desired frequency and/or to attenuate undesired frequencies of electromagnetic radiation. For example, the dopants may be in-situ deposited during the ALD process.

Figure 3I:
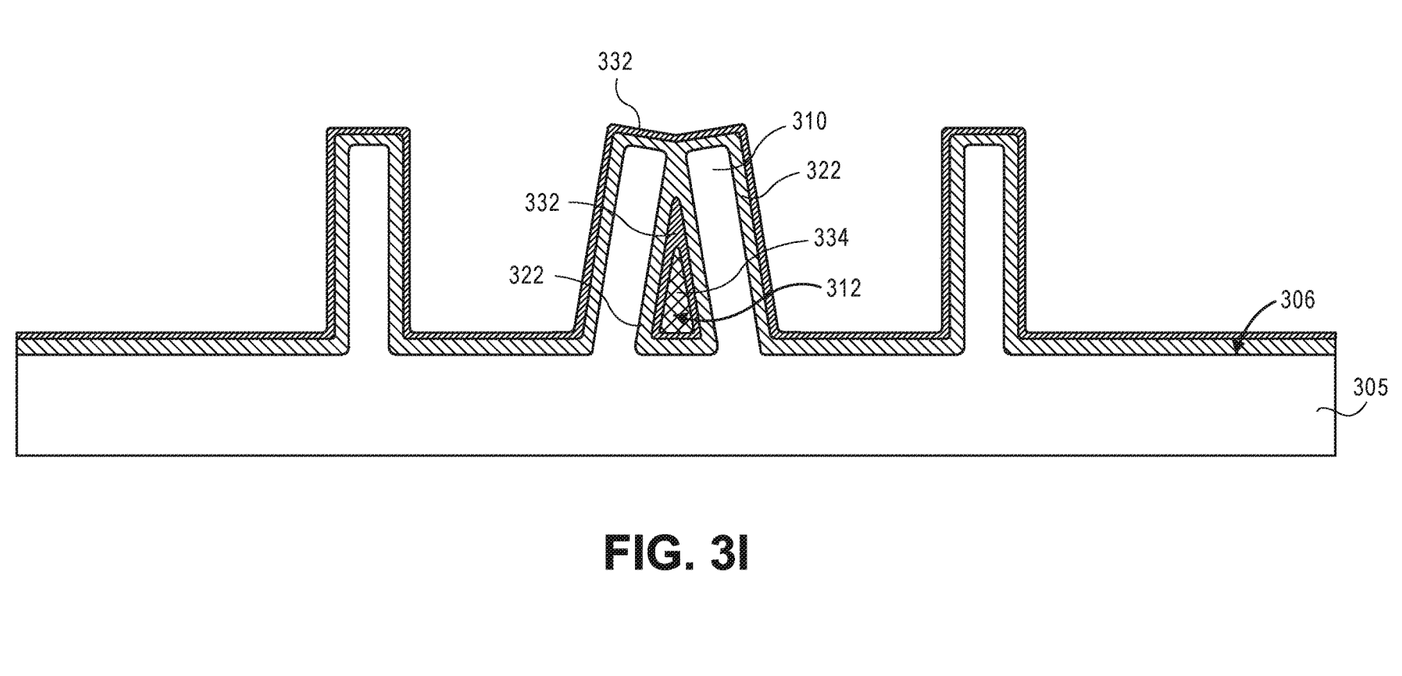
FIG. 3I is a cross-sectional illustration after a core material is deposited within the cavity formed by the bent fins, according to an embodiment of the invention.

Referring now to FIG. 3I, a cross-sectional illustration is shown after a core 334 is deposited within the cavity 312. In an embodiment, the core 334 may be a material that has a refractive index that is greater than the refractive index of the cladding layer 332. In an embodiment, the core 334 is an insulative material. For example, the core may be an oxide, such as an STI oxide. In an embodiment, the core 334 is deposited with a conformal deposition process, such as ALD in order to allow for the core 334 to be formed within the cavity 312. After the material used to form the core 334 is deposited, an etching process (e.g., a dry etching process) may be used to remove the portions of the core material from outside the cavity 312. Since the core 334 is shielded from the etching chemistry by the fins 310, the core 334 will remain in the cavity 312 after the excess core material is removed from the outer surfaces of the fins 310. In additional embodiments, the excess core material may not be removed from outside the electromagnetic waveguide.

Figure 4:
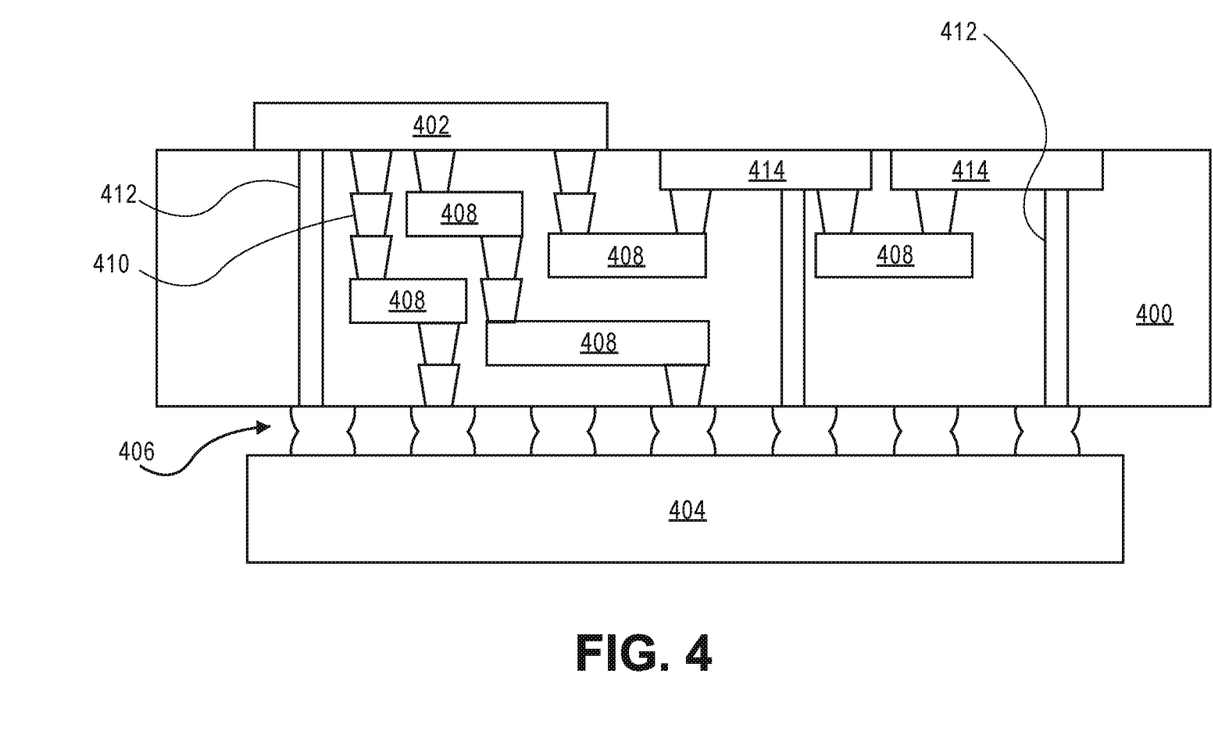
FIG. 4 is a cross-sectional illustration of an interposer implementing one or more electromagnetic waveguides in accordance with an embodiment of the invention.

FIG. 4 illustrates an interposer 400 that includes one or more embodiments of the invention. The interposer 400 is an intervening substrate used to bridge a first substrate 402 to a second substrate 404. The first substrate 402 may be, for instance, an integrated circuit die. The second substrate 404 may be, for instance, a memory module, a computer motherboard, or another integrated circuit die. Generally, the purpose of an interposer 400 is to spread a connection to a wider pitch or to reroute a connection to a different connection. For example, an interposer 400 may couple an integrated circuit die to a ball grid array (BGA) 406 that can subsequently be coupled to the second substrate 404. In some embodiments, the first and second substrates 402/404 are attached to opposing sides of the interposer 400. In other embodiments, the first and second substrates 402/404 are attached to the same side of the interposer 400. And in further embodiments, three or more substrates are interconnected by way of the interposer 400.

The interposer 400 may be formed of an epoxy resin, a fiberglass-reinforced epoxy resin, a ceramic material, or a polymer material such as polyimide. In further implementations, the interposer may be formed of alternate rigid or flexible materials that may include the same materials described above for use in a semiconductor substrate, such as silicon, germanium, and other group III-V and group IV materials.

The interposer may include metal interconnects 408 and vias 410, including but not limited to through-silicon vias (TSVs) 412. The interposer 400 may further include embedded devices 414, including both passive and active devices. Such devices include, but are not limited to, capacitors, decoupling capacitors, resistors, inductors, fuses, diodes, transformers, sensors, and electrostatic discharge (ESD) devices. More complex devices such as radio-frequency (RF) devices, power amplifiers, power management devices, antennas, arrays, sensors, and MEMS devices may also be formed on the interposer 400.

In accordance with embodiments of the invention, apparatuses that include electromagnetic waveguides formed with bent fins, or processes for forming such devices disclosed herein may be used in the fabrication of interposer 400.

Figure 5:
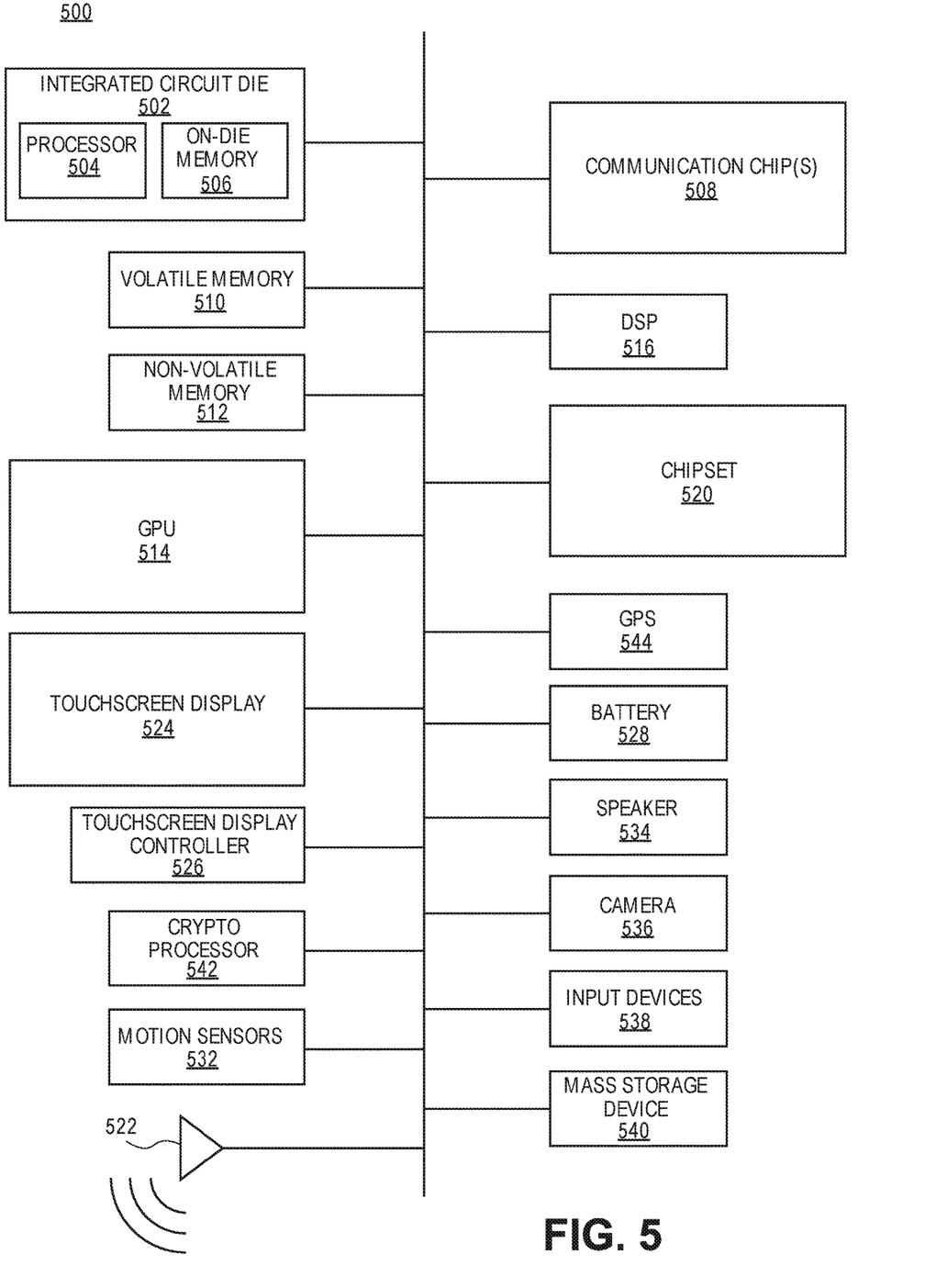
FIG. 5 is a schematic of a computing device that includes one or more electromagnetic waveguides built in accordance with an embodiment of the invention.

FIG. 5 illustrates a computing device 500 in accordance with one embodiment of the invention. The computing device 500 may include a number of components. In one embodiment, these components are attached to one or more motherboards. In an alternate embodiment, these components are fabricated onto a single system-on-a-chip (SoC) die rather than a motherboard. The components in the computing device 500 include, but are not limited to, an integrated circuit die 502 and at least one communication chip 508. In some implementations the communication chip 508 is fabricated as part of the integrated circuit die 502. The integrated circuit die 502 may include a CPU 504 as well as on-die memory 506, often used as cache memory, that can be provided by technologies such as embedded DRAM (eDRAM) or spin-transfer torque memory (STTM or STTM-RAM).

Computing device 500 may include other components that may or may not be physically and electrically coupled to the motherboard or fabricated within an SoC die. These other components include, but are not limited to, volatile memory 510 (e.g., DRAM), non-volatile memory 512 (e.g., ROM or flash memory), a graphics processing unit 514 (GPU), a digital signal processor 516, a crypto processor 542 (a specialized processor that executes cryptographic algorithms within hardware), a chipset 520, an antenna 522, a display or a touchscreen display 524, a touchscreen controller 526, a battery 528 or other power source, a power amplifier (not shown), a global positioning system (GPS) device 544, a compass 530, a motion coprocessor or sensors 532 (that may include an accelerometer, a gyroscope, and a compass), a speaker 534, a camera 536, user input devices 538 (such as a keyboard, mouse, stylus, and touchpad), and a mass storage device 540 (such as hard disk drive, compact disk (CD), digital versatile disk (DVD), and so forth).

The communications chip 508 enables wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 508 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 500 may include a plurality of communication chips 508. For instance, a first communication chip 508 may be dedicated to shorter range wireless communications such as Wi-Fi and Bluetooth and a second communication chip 508 may be dedicated to longer range wireless communications such as GPS, EDGE, GPRS, CDMA, WiMAX, LTE, Ev-DO, and others.

The processor 504 of the computing device 500 includes one or more devices, such as transistors with one or more field plates that are formed over the channel region, according to an embodiment of the invention. The term "processor" may refer to any device or portion of a device that processes electronic data from registers and/or memory to transform that electronic data into other electronic data that may be stored in registers and/or memory.

The communication chip 508 may also include one or more devices, such as one or more electromagnetic waveguides formed with bent fins, according to an embodiment of the invention.

In further embodiments, another component housed within the computing device 500 may contain one or more devices, such as transistors that include one or more electromagnetic waveguides formed with bent fins, or processes for forming such devices, according to an embodiment of the invention.

In various embodiments, the computing device 500 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1 an electromagnetic waveguide, comprising: a first semiconductor fin extending up from a substrate; a second semiconductor fin extending up from the substrate, wherein a centerline of the first semiconductor fin and a centerline of the second semiconductor fin extend from the substrate at a non-orthogonal angle; a cavity defined by the first semiconductor fin, the second semiconductor fin, and a top surface of the substrate; and a cladding layer lining surfaces of the cavity.

Example 2 the electromagnetic waveguide of Example 1, wherein the first semiconductor fin and the second semiconductor fin contact each other at least at one point.

Example 3 the electromagnetic waveguide of Example 1, wherein the first semiconductor fin and the second semiconductor fin do not contact each other.

Example 4 the electromagnetic waveguide of Example 1, Example 2, or Example 3, wherein the cavity is further defined by a conductive layer formed along the surfaces of the first and second semiconductor fins.

Example 5 the electromagnetic waveguide of Example 4, wherein the conductive layer is between the cladding layer and the first and second semiconductor fins.

Example 6 the electromagnetic waveguide of Example 1, Example 2, Example 3, Example 4, or Example 5, wherein the centerline of each fin forms an angle with the tops surface of the substrate that is 1° or more away from orthogonal.

Example 7 the electromagnetic waveguide of Example 6, wherein the angle of the first fin and the angle of the second fin are substantially equal.

Example 8 the electromagnetic waveguide of Example 1, Example 2, Example 3, Example 4, Example 5, Example 6, or Example 7, wherein the first and second semiconductor fins and/or the cladding layer are doped.

Example 9 the electromagnetic waveguide of Example 1, Example 2, Example 3, Example 4, Example 5, Example 6, Example 7, or Example 8, wherein the first and second semiconductor fins are high aspect ratio fins.

Example 10 the electromagnetic waveguide of Example 1, Example 2, Example 3, Example 4, Example 5, Example 6, Example 7, Example 8, or Example 9, further comprising a core formed in the cavity.

Example 11 the electromagnetic waveguide of Example 10, wherein the core has a refractive index that is greater than a refractive index of the cladding layer.

Example 12 the electromagnetic waveguide of Example 1, Example 2, Example 3, Example 4, Example 5, Example 6, Example 7, Example 8, Example 9, Example 10, or Example 11, wherein a pitch between the first semiconductor fin and the second semiconductor fin is less than approximately 50 nm.

Example 13 a method of forming an electromagnetic waveguide, comprising: forming a first and second semiconductor fin on a semiconductor substrate, wherein the first and second semiconductor fins are high aspect ratio fins; depositing an oxide over the substrate and the first and second semiconductor fins; annealing the oxide, wherein annealing the oxide bends the first and second semiconductor fins toward each other; removing the oxide; and forming a conformal cladding layer along the surface of the first and second semiconductor fins.

Example 14 the method of Example 13, wherein the bent first and second semiconductor fins and a top surface of the substrate define a cavity.

Example 15 the method of Example 13 or Example 14, wherein the cladding layer lines the cavity.

Example 16 the method of Example 15, further comprising: forming a core in the cavity, wherein the core has a refractive index that is greater than a refractive index of the cladding layer.

Example 17 the method of Example 15 or Example 16, wherein the first semiconductor fin and the second semiconductor fin contact each other after being bent.

Example 18 the method of Example 15 or Example 16, wherein the first semiconductor fin and the second semiconductor fin do not contact each other after being bent.

Example 19 the method of claim 17, further comprising: forming a conformal conductive layer over the surface of the first and second semiconductor fins prior to forming the conformal cladding layer.

Example 20 the method of Example 13, Example 14, Example 15, Example 16, Example 17, Example 18, or Example 19, further comprising: doping the first and second semiconductor fins; and doping the cladding layer.

Example 21 an on-chip communication system, comprising: a first electromagnetic waveguide; a second electromagnetic waveguide, wherein the first and second electromagnetic waveguides each comprise: a first semiconductor fin extending up from a substrate; a second semiconductor fin extending up from the substrate, wherein a centerline of the first semiconductor fin and a centerline of the second semiconductor fin extend from the substrate at a non-orthogonal angle; a cavity defined by the first semiconductor fin, the second semiconductor fin, and a top surface of the substrate; and a cladding layer lining surfaces of the cavity; and a mixer communicatively coupled to the first and second electromagnetic waveguides.

Example 22 the on-chip communication system of Example 21, wherein the first electromagnetic waveguide is a local oscillator signal line and the second electromagnetic waveguide is an information signal line.

Example 23 the on-chip communication system of Example 21 or Example 22, wherein the mixer outputs a difference signal, wherein the difference signal is in the far infrared range.

Example 24 the on-chip communication system of Example 21, Example 22, or Example 23, further comprising: a conductive layer formed between the cladding layer and the first and second semiconductor fins; and a core formed in the cavity.

Example 25 the on-chip communication system of Example 24, wherein the first and second semiconductor fins are doped and/or the cladding layer is doped, and wherein a refractive index of the core is greater than a refractive index of the cladding layer.

What is claimed is:

1. An electromagnetic waveguide, comprising:
a first semiconductor fin extending up from a substrate;
a second semiconductor fin extending up from the substrate, wherein a centerline of the first semiconductor fin and a centerline of the second semiconductor fin extend from the substrate at a non-orthogonal angle;
a cavity defined by the first semiconductor fin, the second semiconductor fin, and a top surface of the substrate; and
a cladding layer lining surfaces of the cavity.

2. The electromagnetic waveguide of claim 1, wherein the first semiconductor fin and the second semiconductor fin contact each other at least at one point.

3. The electromagnetic waveguide of claim 1, wherein the first semiconductor fin and the second semiconductor fin do not contact each other.

4. The electromagnetic waveguide of claim 3, wherein the cavity is further defined by a conductive layer formed along the surfaces of the first and second semiconductor fins.

5. The electromagnetic waveguide of claim 4, wherein the conductive layer is between the cladding layer and the first and second semiconductor fins.

6. The electromagnetic waveguide of claim 1, wherein the centerline of each fin forms an angle with the tops surface of the substrate that is 1° or more away from orthogonal.

7. The electromagnetic waveguide of claim 6, wherein the angle of the first fin and the angle of the second fin are substantially equal.

8. The electromagnetic waveguide of claim 1, wherein the first and second semiconductor fins and/or the cladding layer are doped.

9. The electromagnetic waveguide of claim 1, wherein the first and second semiconductor fins are high aspect ratio fins.

10. The electromagnetic waveguide of claim 1, further comprising a core formed in the cavity.

11. The electromagnetic waveguide of claim 10, wherein the core has a refractive index that is greater than a refractive index of the cladding layer.

12. The electromagnetic waveguide of claim 1, wherein a pitch between the first semiconductor fin and the second semiconductor fin is less than approximately 50 nm.

13. A method of forming an electromagnetic waveguide, comprising:
forming a first and second semiconductor fin on a semiconductor substrate, wherein the first and second semiconductor fins are high aspect ratio fins;
depositing an oxide over the substrate and the first and second semiconductor fins;
annealing the oxide, wherein annealing the oxide bends the first and second semiconductor fins toward each other;
removing the oxide; and
forming a conformal cladding layer along the surface of the first and second semiconductor fins.

14. The method of claim 13, wherein the bent first and second semiconductor fins and a top surface of the substrate define a cavity.

15. The method of claim 14, wherein the cladding layer lines the cavity.

16. The method of claim 15, further comprising:
forming a core in the cavity, wherein the core has a refractive index that is greater than a refractive index of the cladding layer.

17. The method of claim 15, wherein the first semiconductor fin and the second semiconductor fin contact each other after being bent.

18. The method of claim 15, wherein the first semiconductor fin and the second semiconductor fin do not contact each other after being bent.

19. The method of claim 18, further comprising:
forming a conformal conductive layer over the surface of the first and second semiconductor fins prior to forming the conformal cladding layer.

20. The method of claim 13, further comprising:
doping the first and second semiconductor fins; and
doping the cladding layer.

21. An on-chip communication system, comprising:
a first electromagnetic waveguide;
a second electromagnetic waveguide, wherein the first and second electromagnetic waveguides each comprise:
a first semiconductor fin extending up from a substrate;
a second semiconductor fin extending up from the substrate, wherein a centerline of the first semiconductor fin and a centerline of the second semiconductor fin extend from the substrate at a non-orthogonal angle;
a cavity defined by the first semiconductor fin, the second semiconductor fin, and a top surface of the substrate; and
a cladding layer lining surfaces of the cavity; and
a mixer communicatively coupled to the first and second electromagnetic waveguides.

22. The on-chip communication system of claim 21, wherein the first electromagnetic waveguide is a local oscillator signal line and the second electromagnetic waveguide is an information signal line.

23. The on-chip communication system of claim 22, wherein the mixer outputs a difference signal, wherein the difference signal is in the far infrared range.

24. The on-chip communication system of claim 21, further comprising:
a conductive layer formed between the cladding layer and the first and second semiconductor fins; and
a core formed in the cavity.

25. The on-chip communication system of claim 24, wherein the first and second semiconductor fins are doped and/or the cladding layer is doped, and wherein a refractive index of the core is greater than a refractive index of the cladding layer.

* * * * *